Figure 4:
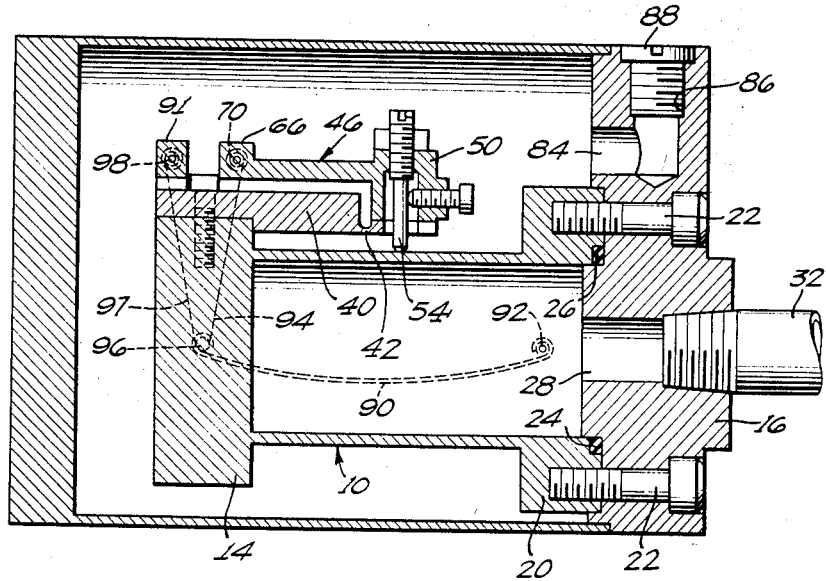

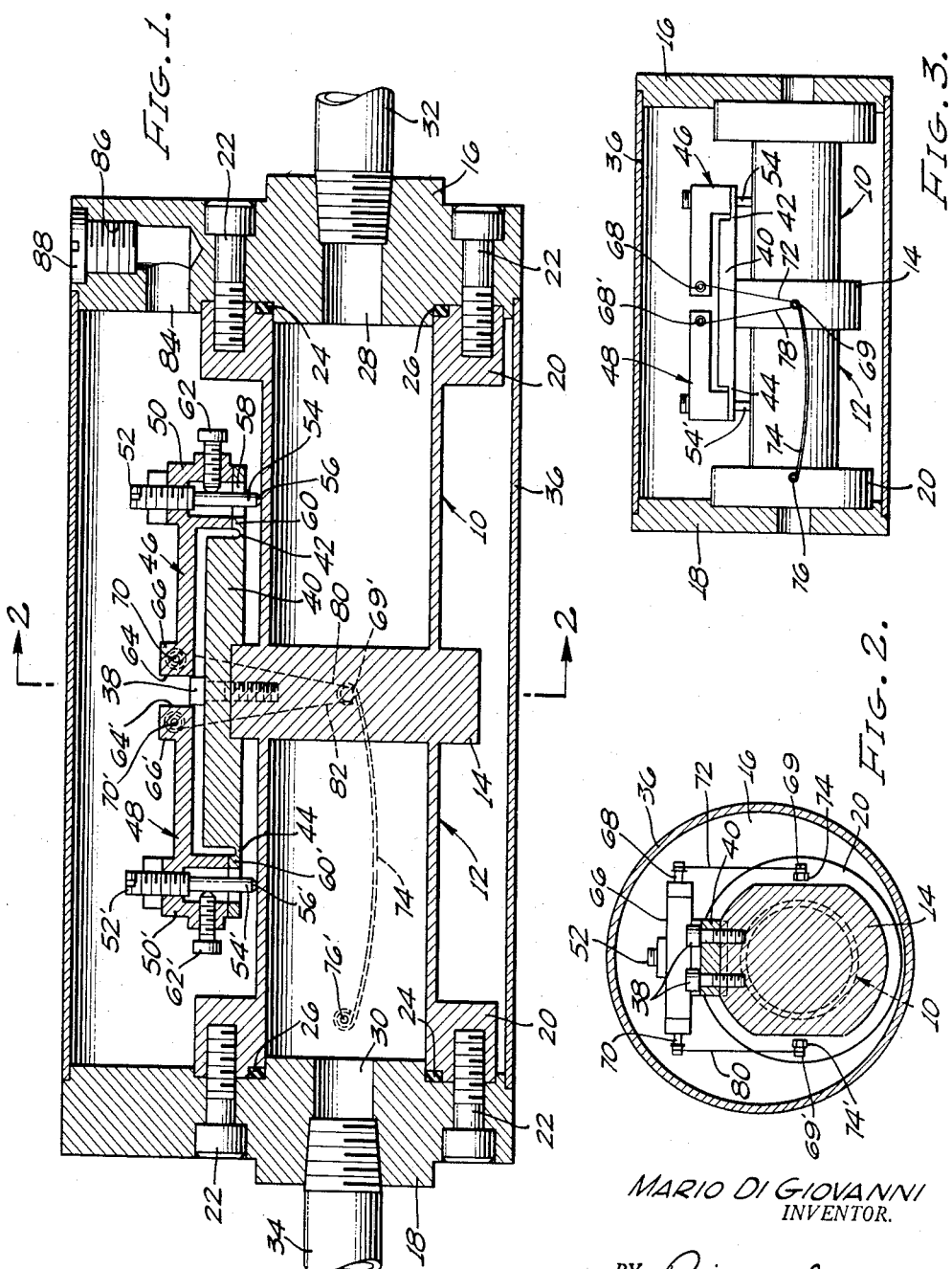

May 5, 1959  M. DI GIOVANNI  2,885,520
PRESSURE TRANSDUCER
Filed Jan. 7, 1957  2 Sheets-Sheet 2

MARIO DI GIOVANNI
INVENTOR.

BY Philip Sutkow

ATTORNEY

2,885,520
PRESSURE TRANSDUCER

Mario Di Giovanni, Pacific Palisades, Calif., assignor to Statham Instruments, Inc., Los Angeles, Calif., a corporation of California Application January 7, 1957, Serial No. 632,840

11 Claims. (Cl. 201—63)

This invention relates to a device for sensing or registering pressure, and is particularly concerned with a differential pressure registering device or transducer.

According to the invention I have provided a pressure measuring device generally in the form of a tube having a closure at one end and an inlet for pressure fluid at the other end. A beam is hingedly mounted outside the tube and a motion transmitting connection, for example, in the form of a probe, is provided between the outside of the tube and the beam. A strain wire is connected to the beam and to a wire support, such wire support being preferably connected to a yieldable constraining member such as a spring.

In the preferred form of the invention device as a differential pressure transducer, a second tube is provided in alignment with the first tube, the tubes being closed off from each other at their inner ends, with their opposite ends open for introduction of pressure fluid. A second beam is mounted on a hinge outside the second tube, and a motion transmitting connection is provided between the outside of the second tube and the second beam. Connected to the beam and to the above noted wire support is a second strain wire. Hence both strain wires are connected to the same wire support which is in turn attached to the yieldable constraining member or spring. In preferred practice, the two beams are in alignment with each other, and the strain wires are connected to the inner ends of the beams and then to the common wire support, which is preferably located adjacent the closure member between the tubes.

Where a single tube and hinged beam are employed in application of the device as a pressure gauge, pressure applied through the open end of the tube induces a radial displacement of the wall of the tube. This displacement is sensed by the motion transmitting connection or probe which is connected to the hinged beam, and through such connection the beam pivots at its hinge and such pivotal motion causes a change in the strain on the strain wire connected to the beam, and the consequent change in resistance in the strain wire is indicated by a change in output from a circuit, such as a bridge, including such strain wire as a component thereof.

Where a pair of such tubes and deflecting beams are employed, as in the preferred embodiment wherein the device is employed as a differential pressure gauge, the beams on the respective tubes will deflect or pivot in equal or in unequal amounts either in a clockwise or counterclockwise direction, and the respective deflections of the beams will cause a proportional change in the resistance of the strain wires connected to said beams, resulting in a change in output from the indicating circuit proportional to the relative changes in resistance and hence proportional to the differential pressure in the tubes producing such changes.

By employing a pivoted beam wherein the motion transmitting connection or probe is positioned much closer to the beam pivot than is the connection between the strain wire at the other end of the beam and such pivot, thereby affording a mechanical advantage, the probe movement can be magnified several times in relation to the corresponding strain on the wires produced by deflection of the beam. Further, by connecting the strain wire support to a resilient connection such as a spring, overload protection on the strain wires is afforded, such resilient connection being preferably less stiff than the strain wires and reducing the strain in said wires when a strain in excess of the safe maximum amount is imparted to the strain wires.

The mechanical advantage afforded by the above noted positioning of the probe and strain wire on the beam with respect to the pivot or hinge point thereof, is a feature of the invention. Such mechanical advantage can be varied as desired to vary the extent of magnification of movement of the probe resulting from expansion or contraction of the tube wall. Another feature is the overload protection on the strain wires afforded by the resilient connection or spring, which is of particular importance in conjunction with the aforementioned mechanical advantage feature.

Figure 5:
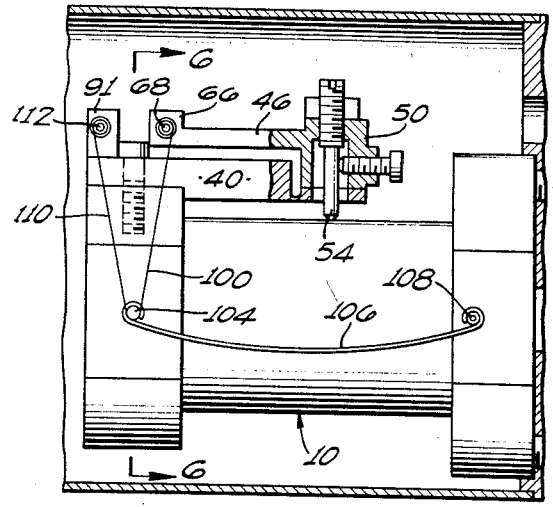
Figure 6:
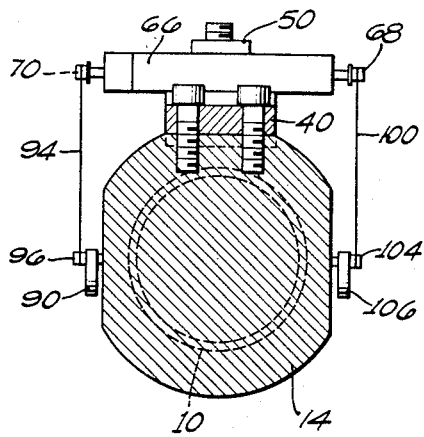

For a clearer understanding of the instant invention, there is described below a preferred embodiment of the invention taken in connection with the accompanying drawing wherein:

Fig. 1 is a longitudinal section of the device;
Fig. 2 is a vertical section taken on line 2—2 of Fig. 1;
Fig. 3 is an elevation of the device of Fig. 1;
Fig. 4 is a longitudinal section of a modification of the device of Fig. 1, illustrating the use of a single beam and a single tube.
Fig. 5 is an elevation of the device of Fig. 4, shown partially in section; and
Fig. 6 is a section taken on line 6—6 of Fig. 5.

Referring to the drawing, numerals 10 and 12 each represent a tube or pipe, the tubes being of substantially the same diameter and in alignment with each other. The tubes are separated by a central partition or fluid tight closure 14 integrally connected to said tubes. The outer ends of tubes 10 and 12 have pressure caps 16 and 18 mounted thereon, said caps each being connected to a flange 20 integral with the outer ends of said tubes, by means of studs 22. Ring seals 24 are each disposed in a groove 26 at the end of flanges 20 to provide a fluid tight connection between the ends of the tubes and the pressure caps. The pressure caps 16 and 18 have fluid inlets 28 and 30 in axial alignment and in communication with tubes 10 and 12, respectively. Fluid connections 32 and 34 are threadably attached to caps 16 and 18, and communicate with the inlets 28 and 30. An outer cylindrical case 36 is disposed about the instrument and is held in position between caps 16 and 18.

Mounted centrally on the closure member 14 by means of studs 38 is a longitudinally extending beam support 40. Integrally connected to the opposite outer ends of beam support 40 through thin-necked portions 42 and 44 are beams 46 and 48, respectively, the necked portions 42 and 44 constituting pivots or hinges on which said beams are designed to deflect. The outer portion of beam 46 carries a downwardly extending housing 50 to the upper end of which is threadably connected a stud 52 carrying a downwardly extending probe 54, the lower end of which has a preferably rounded surface 56 which is adjusted to contact the outer surface of tube 10. The probe 54 passes through an aperture 58 in the base 60 of housing 50, said base being connected integrally with hinge point 42.

In the same manner beam 48 carries at its outer end housing 50' carrying a stud 52' with a depending probe 54' the lower rounded end 56' of which is adjusted to make contact with the outer surface of tube 12. The base 60' through which probe 56' passes, is integrally connected to hinge 44. The housings 50 and 50' each have an adjustment screw 62 and 62' threaded into their sides, the ends of said screws making contact with the respective probes 54 and 54' for altering the position thereof longitudinally of tubes 10 and 12.

It will be seen that the beams 46 and 48 are positioned in alignment with each other over and parallel to beam support member 40 and spaced therefrom. Also the inner adjacent ends 64 and 64' of beams 46 and 48 are spaced apart. Thus, it is noted that beams 46 and 48 are free to deflect or pivot either clockwise or counterclockwise on their hinge points 42 and 44, respectively.

At the inner ends of beams 46 and 48 are carried integral blocks 66 and 66'. Block 66 carries at its opposite outer ends a pair of insulated pins 68 and 70 aligned transversely of beam 46, and block 66' likewise has connected to its opposite outer ends a pair of transversely aligned insulated pins 68' and 70'. A strain wire 72 is stretched in tension between pin 68 and a pin 69 mounted at one end of a flat spring 74, the opposite end of which is connected to a fixed pin 76 connected to flange 20 of pipe 12. A second strain wire 78 is connected in tension between pin 68' and pin 69. A third strain wire 80 is looped in tension on the other side of tubes 10 and 12, between pin 70 and a pin 69' mounted at the end of a second flat spring 74' connected at its other end to a fixed pin 76' mounted on flange 20 of tube 12. A fourth strain wire 82 is connected in tension between pin 70' and pin 69'.

The strain wires 72, 78, 80 and 82 constitute the active arms of a bridge circuit and are connected to leads (not shown) passing through bores 84 and 86 in pressure cap 16, for external connection in a well known manner to a suitable indicating instrument such as a galvanometer (not shown) and to a source of potential (not shown). The bore 86 is threaded to receive a screw 88 for holding such leads in position in the bore 86.

The springs 74 and 74', to which pins 69 and 69' are connected, are spaced from the adjacent sides of tube 12 and the adjacent sides of the closure member 14 so that the free ends of the springs are free to oscillate on the fixed pivots 76 and 76'. Springs 74 and 74' are bowed and placed under tension, as seen in Figs. 1 and 3, when the strain wires are connected in tension to the pins 69 and 69' at the free ends of such springs. These springs are weaker or less stiff than the strain wires.

In operation, assume that pressure fluids each exerting a positive pressure are applied through connections 32 and 34 and inlets 28 and 30 to the interior of tubes 10 and 12. If the pressures in these tubes are equal so that the tubes expand outwardly the same amount, upward displacement of probe 54 will cause beam 46 to deflect or pivot counterclockwise about the hinge point 42 an amount equal to the degree of clockwise motion of beam 48 about its hinge 44 due to upward displacement of probe 54' resulting from the pressure in tube 12. The decreased strain on wires 72 and 80 by such deflection of beam 46 will then be equal to the decreased strain in wires 78 and 82 produced by the above noted deflection of beam 48, and the bridge will remain balanced, indicating no differential pressure as between the fluids in tubes 10 and 12.

If, however, the pressure of the fluid in say tube 10 is greater than that in tube 12, the amount of pivotal motion of beam 46 will be greater than that of beam 48. The result will be that wires 72 and 80 will become more relaxed and have less tension than wires 78 and 82, due to greater counterclockwise motion of beam 46 than corresponding clockwise motion of beam 48. The bridge will thus become unbalanced to produce an output which is linear with respect to the difference in the amounts of displacement between probes 54 and 54' and hence linear with respect to the differential pressure in tubes 10 and 12.

While positive pressure applied in tubes 10 and 12 will in both cases produce a relaxation of tension of wires 72 and 80, and wires 78 and 82, instead of applying positive fluid pressures to tubes 10 and 12, negative pressures or partial vacuums may be applied in such tubes, or a positive pressure applied to one tube and a negative pressure applied to the other. It will be seen that where a negative pressure is applied to tube 10, thus causing the tube to contract, probe 54 will move downward against tube 10, as seen in Fig. 1, producing clockwise motion of beam 46 about its hinge 42, and a tensioning of wires 72 and 80. Where negative pressure is applied to tube 12, consequent downward motion of probe 54' against the tube will cause counterclockwise movement of beam 48 about its hinge 44, also resulting in a tensioning of wires 78 and 82.

Hence, when negative pressures are applied to both tubes 10 and 12, both pairs of strain wires 72 and 80, and 78 and 82 will be increased in tension, and if positive pressure is applied say to one of the tubes 10 and negative pressure applied to the other tube 12, one pair of the wires, e.g., 72 and 80, will be relaxed and the other pair of wires 78 and 82 will be further stressed.

It will be observed that the first lever arms between probes 54 and 54' and their respective hinge points 42 and 44, is each much smaller than the second lever arms between blocks 66 and 66' at the ends of beams 46 and 48, and the respective hinges 42 and 44 of said beams. The length of said second lever arms may, for example, be five times the length of said first lever arms. Hence, it will be seen that there is produced a large mechanical advantage in that the displacement of probes 54 and 54' due to pressures applied in tubes 10 and 12 can be magnified to produce a much larger displacement of the blocks 66 and 66' at the ends of beams 46 and 48 and hence a substantial variation in the strain on the strain wires. This produces greater variations in the output of the bridge for any given differential pressure and increases the sensitivity of the instrument.

Screws 62 and 62' may be adjusted to move the probes longitudinally a small amount so that the beams 46 and 48 are undeflected or equally deflected in the initial position with no differential pressure applied to the tubes, so as to produce a balanced bridge under these conditions. Adjustment of screws 62 and 62' can also be made where, for example, there are irregularities in the outer surface of tubes 10 and 12, e.g., due to manufacturing tolerances.

While I have indicated that the bridge is balanced in the zero position or under zero differential pressure, I can instead have an unbalanced bridge in the initial starting position or when there is no differential pressure, the degree of change of such unbalance on application of a differential pressure being proportional or linear to such applied differential pressure.

The springs 74 and 74' preferably have a stiffness or spring constant which is substantially smaller than the stiffness or spring constant of the strain wires. Hence, due to the attachment of the strain wires to said springs, it will take a relatively large deflection of beams 46 and 48 to cause a dangerous increase in strain in the strain wires approaching the maximum safe strain. This eliminates the need for stops to prevent overload on the strain wires while at the same time this feature permits substantial deflection of the beams at their points of attachment to the strain wires, as result of the mechanical advantage produced by placement of the beam hinges 42 and 44 much closer to the probes 54 and 54' than to said points of attachment, as aforementioned.

Instead of applying the invention principles in the form of a differential pressure registering device or gauge for measuring differences in pressure between two fluids, as illustrated in the drawing, it will be understood that said principles can also be applied to a single pressure gauge employing one tube such as 10 and one beam such as 46, for registering the pressure of a single fluid. In such a system, illustrated in Figs. 4 to 6, a block 91 is fixedly connected to beam support 40. A first spring 90, like spring 74', is connected at one end to a fixed pin 92. A strain wire 94 is stretched in tension between pin 70 of block 66 and a pin 96 carried at the free end of spring 90. A second strain wire 97 is connected in tension between pin 98 on block 91, and pin 96 of spring 90.

On the opposite side of tube 10, a strain wire 100 connects pin 68 on block 66 at the end of beam 46, with a pin 104 at one end of a second flat spring 106 the opposite end of which is connected to a fixed pin 108. Another strain wire 110 is connected between a pin 112 on fixed block 91, with pin 104 of spring 106. Viewing Fig. 6, it will be seen that strain wires 94 and 97 and spring 90 are on one side of tube 10, and strain wires 100 and 110 and spring 106 are located on the diametrically opposite side of tube 10. Strain wires 94, 97, 100 and 110 are connected in a bridge circuit.

Counterclockwise rotation of beam 46 as result of positive pressure applied in tube 10 producing an expansion of the tube, will cause a relaxation of wires 94 and 100, and a tensioning of wires 97 and 110. On the other hand, clockwise rotation of beam 46 by reduced pressure in tube 10 will cause increased tension in wires 94 and 100, and a relaxation of wires 97 and 110. The resulting changes in resistance of the wires in either case will be sensed by the bridge.

If desired, I may modify the device of Figs. 4 to 6 by mounting a second pivoted beam similar to beam 46 on the diametrically opposite side of tube 10 from beam 46, with a probe positioned at the end of the second beam and in contact with the outer surface of tube 10, like probe 54. The end of the second beam may be connected to a second strain wire structure like that shown in Figs. 4 to 6, with the opposite ends of the strain wires of such structure connected to springs such as 90 and 106, said strain wires being connected in a bridge circuit. The device of this modification can be made more sensitive than that of Figs. 4 to 6.

From the foregoing it is seen that I have designed a pressure registering device, preferably for registering differential pressures, employing a hinged beam, a motion transmitting connection or probe in contact with the outside of a pressure fluid conduit, said probe being displaced an amount in response to fluid pressure variations in said conduit, and a strain wire transducer connected to said beam, wherein small displacements of said probe cause relatively large movements at the end of the beam to which the strain wire is connected, to thus produce greater variations in tension on the strain wire, and resulting in a highly sensitive instrument. In conjunction with this mechanical advantage feature, the strain wire is also connected to a yieldable member or spring of a stiffness permitting a relatively large displacement of the end of the beam to which the strain wire is connected while at the same time protecting the strain wires against overloading.

While I have described particular embodiments of my invention for the purpose of illustration, it should be understood that various modifications and adaptations thereof may be made within the spirit of the invention as set forth in the appended claims.

I claim:

1. A pressure transducer which comprises a tube, a closure at one end of said tube, a fluid pressure inlet at the other end of said tube, an elongated beam mounted longitudinally of said tube externally thereof, a fixed support for said beam, a hinge for said beam on said support said beam deflecting on said hinge in a plane passing through the center of said tube, a motion transmitting connection between the outside of said tube and said beam on one side of said hinge, a strain wire connected to said beam on the other side of said hinge, and a wire support for said strain wire, remote from said beam, said strain wire extending at an angle to said beam.

2. A pressure transducer as defined in claim 1, including a yieldable constraining means, said wire support being connected to said means.

3. A pressure transducer as defined in claim 2, wherein said yieldable constraining means is a spring.

4. A pressure transducer as defined in claim 1, wherein the distance between said motion transmitting connection and the hinge of said beam is substantially less than the distance between the point of connection of said strain wire to said beam and said hinge.

5. A pressure transducer which comprises a tube, a closure at one end of said tube, a fluid pressure inlet at the other end of said tube, an elongated beam mounted longitudinally of said tube externally thereof, a fixed support for said beam, a hinge for said beam on said support said beam deflecting on said hinge in a plane passing through the center of said tube, a motion transmitting connection between the outside of said tube and one end of said beam on one side of said hinge, a strain wire connected to the other side of said beam on the other side of said hinge, a wire support for said strain wire remote from said beam, a spring, said wire support being connected to said spring, the stiffness of said spring being substantially less than the stiffness of said strain wire, said strain wire extending transversely of said beam, the distance between said motion transmitting connection and the hinge of said beam being substantially less than the distance between the point of connection of said strain wire to said beam and said hinge.

6. A pressure transducer which comprises a tube, a closure at one end of said tube, a fluid pressure inlet at the other end of said tube, a beam mounted on a hinge outside said tube, a motion transmitting connection between the outside of said tube and said beam, a strain wire connected to said beam, a second tube, a closure at one end of said second tube, a fluid pressure inlet at the other end of said second tube, a second beam mounted on a hinge outside said second tube, a second motion transmitting connection between the outside of said second tube and said second beam, a second strain wire connected to said second beam, and a wire support for both of said strain wires, said strain wires each being adapted to be tensioned or relaxed on deflection of their respective associated beams.

7. A pressure transducer as defined in claim 6, including a spring, said spring having a spring constant substantially less than the spring constant of said strain wires, said wire support being connected to said spring.

8. A pressure transducer as defined in claim 7, wherein the distance between each of said motion transmitting connections and the adjacent hinge on said beams is substantially less than the distance between the point of connection of each strain wire to its associated beam and the adjacent hinge on said beams.

9. A pressure transducer which comprises a tube, a closure at one end of said tube, a fluid pressure inlet at the other end of said tube, a beam support fixedly mounted on the outside of said tube, an elongated beam integrally connected to said beam support by a narrow neck, said beam positioned longiudinally of said tube and being adapted to deflect about said neck as a hinge in a plane passing through the axis of said tube, a probe mounted on one end of said beam adjacent to but spaced from said hinge and in contact with the outer surface of said tube, a wire mounting at the other end of said beam spaced from said hinge, an electrical resistance strain wire connected at one end to said wire mounting and extending substantially transversely of said beam, and a wire support for the opposite end of said strain wire, the distance between said probe and said hinge being substantially less than the distance between said wire mounting and said hinge.

10. A pressure transducer as defined in claim 9, including a spring, said spring having a spring constant substantially less than the spring constant of said strain wire, said wire support being connected to said spring.

11. A pressure transducer which comprises a tube, a closure at one end of said tube, a fluid pressure inlet at the other end of said tube, a beam support mounted on the outside of said tube, a beam integrally connected to said beam support by a narrow neck, said beam being adapted to deflect about said neck as a hinge, a probe mounted on one end of said beam adjacent said hinge and in contact with the outer surface of said tube, a wire mounting at the other end of said beam, a second tube, said closure closing one end of said second tube, said tubes being in substantial alignment, a fluid pressure inlet at the other end of said second tube, a second beam integrally connected to said beam support by a second narrow neck, said second beam being adapted to deflect about said second neck as a second hinge, a second probe mounted on one end of said second beam adjacent said second hinge and in contact with the outer surface of said second tube, a second wire mounting at the other end of said second beam, a second electrical resistance strain wire connected to said second wire mounting, a wire support, the opposite ends of said first and second strain wires being connected to said wire support, a spring, said wire support being mounted on said spring, said spring having a spring constant substantially less than the spring constant of said strain wires, the distance between each of said probes and the adjacent hinge on said beams being substantially less than the distance between each of said wire mountings and the adjacent hinge on said beams, said strain wires each being adapted to be tensioned or relaxed on deflection of their respective associated beams.

References Cited in the file of this patent

UNITED STATES PATENTS

| | | |
|---|---|---|
| 2,036,458 | Carlson | Apr. 7, 1936 |
| 2,466,034 | Mathews | Apr. 5, 1949 |
| 2,600,701 | Statham | June 17, 1952 |